United States Patent [19]

Mele

[11] Patent Number: 5,222,781
[45] Date of Patent: Jun. 29, 1993

[54] AUTOMATICALLY ADJUSTABLE BICYCLE SEAT APPARATUS

[76] Inventor: Peter C. Mele, P.O. Box 1596, Burlington, Vt. 05402

[21] Appl. No.: 819,994

[22] Filed: Jan. 13, 1992

[51] Int. Cl.$^5$ .............................................. B60N 2/38
[52] U.S. Cl. ....................................... 297/105; 297/301
[58] Field of Search ............... 297/195, 196, 208–213, 297/326–328, 292, 293, 300–305; 248/575, 597, 598

[56] References Cited

U.S. PATENT DOCUMENTS

| | | | |
|---|---|---|---|
| 617,000 | 1/1899 | Wilberforce | 297/208 |
| 3,881,772 | 5/1975 | Mohrman | 297/300 |
| 4,214,726 | 7/1980 | Karrip et al. | 297/304 X |
| 4,693,627 | 9/1987 | Borromeo | 297/195 X |
| 4,943,115 | 7/1990 | Stucki | 297/301 |
| 5,029,940 | 7/1991 | Golynsky et al. | 297/301 |

FOREIGN PATENT DOCUMENTS 610862 10/1960 Italy ................................. 297/195

Primary Examiner—Laurie K. Cranmer
Attorney, Agent, or Firm—Thomas N. Neiman

[57] ABSTRACT

The automatically adjustable bicycle seat apparatus is designed for use with bicycles and comprises a clamping device that attaches a seat to a bicycle. The apparatus has spring mechanisms that permit the seat to pivot upward or downward as necessary. The apparatus will also provide fore and aft movement which allows the force necessary to cause tilting to be customized to the rider's individual preference (in conjunction with changeable springs and combinations of springs) by sliding the seat relative to the rotation shaft the rider changes his balance point relative to that shaft. Limit stops allow only a limited range of motion, both upward and downward. The combined action of the apparatus to automatically adjust in a coordinated manner to the position of the rider and the angle of the torso and crotch.

2 Claims, 1 Drawing Sheet

U.S. Patent       June 29, 1993       5,222,781
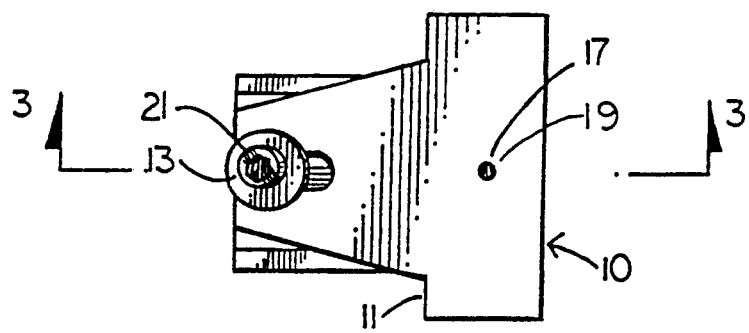
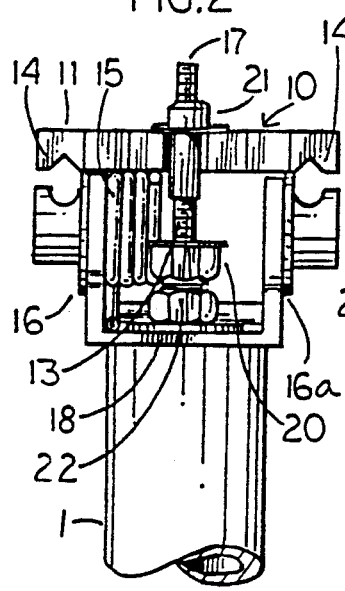
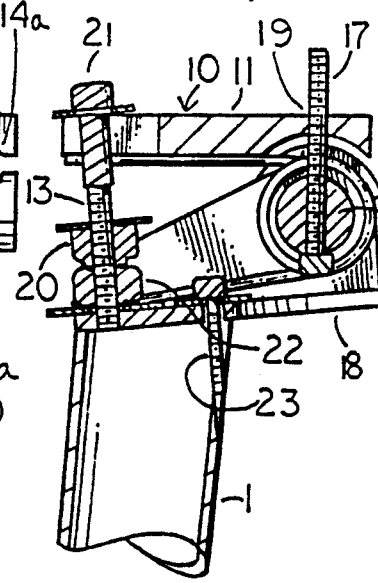
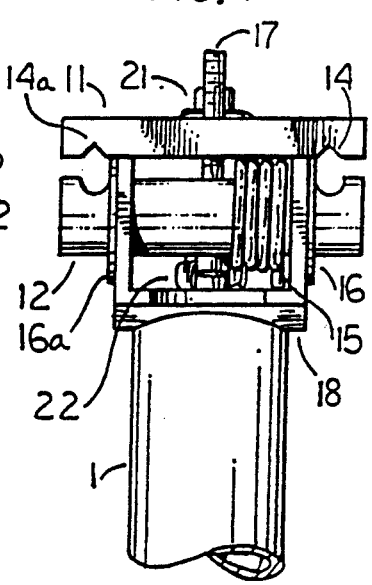
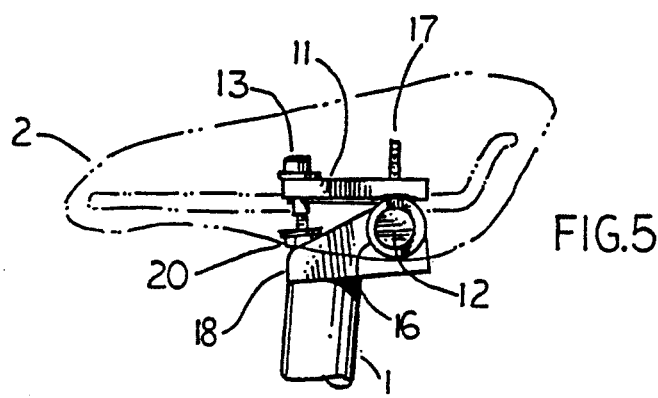

AUTOMATICALLY ADJUSTABLE BICYCLE SEAT APPARATUS

This invention pertains to bicycles and bicycle seats, and in particular to an automatically adjustable bicycle seat apparatus that is designed to adjust to the body's forward inclination automatically by moving downward to a maximum allowable limit.

There are a whole host of different bicycle seats on the market today. What is needed, though, is a bicycle seat that is designed for automatic adjustment to riding positions while allowing the user to have a completely comfortable support for his or her crotch.

The difficulties that are inherent in other bicycle seats and and should be overcome include the following: the lack of automatic adjustment of the angle. There have been a number of attempts to solve these problems. The U.S. Pat. No. 617,000 issued to W. B. Wilberforce on 3 Jan. 1899 for a "Support for Saddles For Cycles" and the U.S. Pat. No. 4,693,627 issued to Lucio Borromeo, for a "Device For Fixing The Saddle Of A Bicycle To A Saddle Pillar And For Adjusting The Inclination of The Saddle" on 15 Sept. 1987 are both attempts to attach seats and to permit the user to make adjustments to that seat. The main problem is that when riders change their riding position on the bicycle the angle of their crotch changes but the angle of the seat doesn't, causing uneven distribution of weight and pain.

Clearly, it is desirable for an automatically adjustable bicycle that provides quick, simplified and comfortable adjustment for the user. It is the object of this invention to set forth an automatically adjustable bicycle seat which avoids the disadvantages and limitations, above-recited, which occur in previous adjustable bicycle seats. It is another object of this invention to teach means that can easily by installed on all standard bicycles.

Particularly, it is the object of this invention to set forth an automatically adjustable bicycle seat apparatus, for use to provide comfortable support while bicycling in all riding positions, comprising a top clamp assembly; said top clamp assembly comprising a lightweight frame-type structure; said structure having an aperture located therein; said structure further having notches formed on the lower surface of said structure; a bottom housing; said bottom housing having rotation shaft means located therein; said rotation shaft means having an aperture located therein; spring means encircling said rotation shaft means; adjustment means; said adjustment means comprising bolt connection means; and said bolt means having tensioning adjustment means.

Further objects and features of this invention will become more apparent by reference to the following description taken in connection with the accompanying figures, in which:

FIG. 1 is a top plan view of the novel automatically adjustable bicycle seat apparatus;

FIG. 2 is a front elevational view thereof;

FIG. 3 is a side cross-sectional view taken along line 3—3 of FIG. 1;

FIG. 4 is a rear elevational view thereof; and

FIG. 5 is a perspective view of the novel apparatus in position on a bicycle seat post.

As shown in the figures, the novel automatically adjustable bicycle seat apparatus 10 comprises a top clamp section 11 that has an aperture which receives the main adjustment bolt 13 for the apparatus. A bottom housing 18 holds a seat rotation shaft 12 that has slots cut out at each end that when the unit is mated with the top clamp section 11 forms a bicycle seat rail connections 14 and 14a. A seat rotation shaft spring 15 is wound around the seat rotation shaft 12. Teflon washers 16 and 16a may be placed around the seat rotation shaft 12 after it passes through the bottom housing 18. A clamping bolt 17 is positioned through an aperture 19 in the seat rotation shaft 12. The apparatus 10 fits over the bicycle seat post 1 and the seat 2 has twin rails that slide through the seat side rail connections 14 and 14a. A stop 20 provides a limit for the movement of the seat. The head 21 of the bolt 13 provides for a rear tilt inclination. Nut 22 clamps bottom housing 18 to the seat post along with bolt 23 which clamps bottom housing 18 to the seat post and also maintains alignment. Slots or a series of apertures for the main adjustment bolt 13 and bolt 23 provide for fore and aft adjustment of the entire apparatus.

The apparatus operates in the following manner. The seat is adjusted as normal by the seat rail clamp position, and the head of the main adjustment bolt which is adjusted by the amount that the bolt that is secured into the seat post to a comfortable position approximately horizontal for most riders. As the rider leans further forward (on the aero bars), the forward crotch area moves downward as does the seat to the adjustable stop nut on the bolt. The same bolt along with bolt 22 (in this embodiment) also clamps the whole mechanism to the seat post.

While I have described my invention in connection with specific embodiments thereof, it is clearly to be understood that this is done only by way of example and not as a limitation to the scope of my invention as set forth in the objects thereof and in the appended claims.

I claim:

1. An automatically adjustable bicycle seat apparatus, for use to provide comfortable support while bicycling in all riding positions, comprising:
    a top clamp assembly;
    said top clamp assembly comprising a lightweight frame-type structure;
    said structure having a slot and aperture located therein;
    said structure further having notches formed on the lower surface of said structure;
    a bottom housing;
    said bottom housing having rotation shaft means located therein;
    said rotation shaft means having an aperture located therein;
    spring means encircling said rotation shaft means;
    adjustment means for allowing the upward and downward range of rotation of the forward tip of said seat;
    said adjustment means comprising bolt connection means having a head, an upper end and a middle portion;
    said adjustment means further comprises said head of said bolt connection means positioned at said upper end of said bolt connection means for limiting the upward range of rotation of said forward tip of said seat; and
    said adjustment means further comprises an adjustable locking nut positioned on said middle portion of said bolt connection means for limiting the downward range of motion of said forward tip of said seat.

2. An automatically adjustable bicycle seat apparatus, according to claim 1, wherein:
    said top clamp assembly notches form rail guides for said apparatus when said top clamp assembly is mated with said bottom housing.

* * * * *